United States Patent [19]

Mancini

[11] Patent Number: 5,126,378
[45] Date of Patent: Jun. 30, 1992

[54] SOLVENT FOR FOAMED PLASTIC

[75] Inventor: Thomas Mancini, Lincoln Park, N.J.

[73] Assignee: U.S. Polychemical Corporation, Spring Valley, N.Y.

[21] Appl. No.: 795,723

[22] Filed: Nov. 21, 1991

[51] Int. Cl.$^5$ ............................................... C08J 9/14
[52] U.S. Cl. .................................. 521/88; 521/97; 521/98; 521/114; 521/130; 521/145
[58] Field of Search .................. 521/88, 97, 98, 114, 521/130, 143, 145

[56] References Cited

U.S. PATENT DOCUMENTS 2,911,381  11/1959  Roth ........................................ 521/88
2,950,261   8/1960  Buchholtz et al. ..................... 521/88

Primary Examiner—Morton Foelak
Attorney, Agent, or Firm—Notaro & Michalos

[57] ABSTRACT

A non-toxic chlorine and fluorine free solvent can be used as the major component in a carrying agent for PVC foam products made in a hot mold process.

5 Claims, No Drawings

SOLVENT FOR FOAMED PLASTIC

FIELD AND BACKGROUND OF THE INVENTION

The present invention relates in general to solvents, and in particular to a new and useful solvent which can be used in the making of foamed plastic, in particular, PVC foam.

A wide variety of foamed plastics are known which can be manufactured according to many conventional techniques.

Foamed plastics range in density anywhere from one tenth to sixty pounds per cubic foot, and range from a rigid material suitable for structural use, to flexible cushion like substances. The foamed plastic may also have a wide range of cellular formations from open cells, to interconnected cells, to closed cells. For the making of PVC foam having a closed or substantially closed construction, a set of solvents are added to PVC pellets in steps. The solvents which are commonly referred to as carrying agents, include methylene chloride, trichloroethylene, fluorinated hydrocarbon (HCFC or CFC) FREON (a trademark identifying a group halogenated hydrocarbons containing one ore more fluorine atoms), ethyl acetate and toluene.

It is common practice to vary the proportions of the foregoing solvent components, and even to eliminate one or more component by increasing another component.

A blowing agent is also added which, when heated, produces gas which forms the cells of the product. Examples of suitable blowing agents for PVC foam products are sodium bicarbonate, halocarbons such as CC13 F, and hydrazine.

To form the foamed product, the mixture is supplied to a heated mold where it expands to fill the space of the mold.

Several if not all of the solvent or carrying agent components of known PVC foaming processes are environmentally undesirable.

The chlorinated and fluorinated components are particularly damaging to the environment and are being subjected to ever increasing Government regulation. The aromatic components such as toluene are also undesirable and pose safety hazards to the workers involved in making the foam products.

Accordingly an alternate solvent or carrying agent which avoids some or all of the objectionable carrying components would be particularly useful.

SUMMARY OF THE INVENTION

The main object of the present invention is to provide a new solvent which can be used as part of the carrying agent in the foamed plastic industry, in particular for PVC foam, which avoids some or all of the chlorinated and fluorinated compounds now used in the carrying agents, and to reduce the aromatic and other compounds as well.

In particular it has been found by the present inventor that the aromatic hydrocarbons can be reduced by up to about 30% and the chlorinated and fluorinated hydrocarbons can be eliminated altogether. Esters such as ethyl acetate can also be reduced by up to about 75%.

Specifically, the solvent of the present invention can completely replace methylene chloride and all other halogenated components. Toluene was eliminated completely or reduced and ethyl acetate was reduced by 75%. This was verified by experiments conducted during a hot molding process to form open and closed cell PVC foam.

The solvent of the invention can be used in the making of closed cell PVC foam products used, for example, for the soles of shoes, floatation in aircraft and the like. The starting material comprises solvent, PVC and a blowing agent which are poured into a steel or aluminum mold which is then heated to about 350° F. for thirty hours. The material expands filling the mold to form the product.

Steel molds are preferred since they require less time than aluminum molds which take longer to heat. Aluminum is less likely to oxidize, however. Oxidation of steel molds is caused by the chlorine or fluorene mixing with moisture to form hydrochloric or hydrofluoric acid in the mold. Aluminum is resistant but steel is not. Some mold manufacturers chrome plate their molds to avoid this oxidation problem but this is expensive.

The solvent of the invention, by eliminating 100% of the chlorinated and fluorinated compounds, eliminates the oxidation. Environmentally this also is important. The aromatic hydrocarbons are also reduced by up to about 30% by weight.

It has also been found that overall, up to 50% less solvent must be used in present invention, reducing material handling problems, expense and environmental impact.

The present invention eliminates techniques which were used in the past to try and reduce or change objectionable solvents. For example it was known in the past to replace methylene chloride by using trichloroethyl (which however are equally toxic) or FREON type solvents which are ozone depleting and extremely expensive. Others increased the ethyl acetate and toluene amounts to eliminate the third halogenated ingredient. The solvent remained toxic however.

The present invention virtually eliminates the most objectionable components of the carrying agent and further reduces the overall amount of carrying agent needed.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

The solvent or foam process carrying agent of the present invention has the following formulation which lists each ingredient in a range of percentages by

| The Formulation | |
|---|---|
| Dimethyl Glutarate | 5–10% |
| Aliphatic Hydrocarbon | 50–75% |
| Dimethyl Adipate | 1–5% |
| Methyl Salicylate | 10–15% |
| Dimethyl Succinate | 2–7% |
| Dipropylene Glycol Methyl Ether | 10–15% |
| Flash Point | 161 F. (TCC) |
| Weight Per Gallon | 7.4 lbs. |

None of the components of the solvent are environmentally objectionable or toxic.

Another advantage of the invention is that the solvent, as a single mixture can be added to the PVC plus blowing agent mixture in a single step rather than in multiple steps as is conventionally used in the hot molding of PVC foam products.

An example of the solvent of the present invention has the following formulation:

| | |
|---|---|
| Dimethyl Glutarate | 9.9% |
| Aliphatic Hydrocarbon | 60% |
| Dimethyl Adipate | 2.6% |
| Methyl Salicylate | 10% |
| Dimethyl Succinate | 2.5% |
| Dipropylene Glycol Methyl Ether | 15% |
| Total | 100% |

One known technique for making closed cell PVC foam utilizes 20 lbs. of ethyl acetate, 7.5 lbs. toluene, and 20 lbs. methylene chloride. For this and the following examples, amount of the components in pounds is given which is used in practice in the PVC foam making industry.

The resulting hot molded foam product had cells which were 99% closed, but not completely closed.

One example of the invention utilized 20 lbs. of ethyl acetate, 7.5 lbs. of toluene and only 10 lbs. of the solvent of the present invention. While the ester and aromatic solvents were thus kept the same as in the previous example, the amount of chlorinated component was eliminated altogether and the replacement, namely the solvent of the present invention was provided only in one half the original amount.

The resulting hot molded foam product was 100% closed cell and was stronger than the product made according to the prior art technique.

A second example of the invention utilized only 5 lbs. of ethyl acetate (a 75% reduction over the previous example), 5 lbs. of toluene (a more than 30% reduction) and 10 lbs. of the solvent of the invention. The resulting product had cell closure of 100% and was otherwise of high quality.

While a specific embodiment of the invention has been shown and described in detail to illustrate the application of the principles of the invention, it will be understood that the invention may be embodied otherwise without departing from such principles.

What is claimed is:

1. A method of forming a foamed plastic product comprising:
   mixing a plastic to be foamed with a blowing agent and a carrying agent which is free of chlorinated and fluorinated components, and which includes a solvent containing: about 5-10% by weight dimethyl glutarate, about 50-75% by weight aliphatic hydrocarbon, about 1-5% by weight dimethyl adipate, about 10-15% by weight methyl salicylate, about 2-7% by weight dimethyl succinate, and about 10-15% by weight dipropylene glycol methyl ether; and at least one additional solvent component;
   supplying the mixture to a heated mold where the blowing agent expands to form the foam plastic product; and
   removing the product from the mold.

2. A method according to claim 1, wherein the at least additional solvent component comprises ethyl acetate.

3. A method according to claim 1, wherein the plastic comprises PVC.

4. A method according to claim 1, wherein the at least one additional solvent component is selected from the group consisting of an ester and an aromatic solvent.

5. A method according to claim 4, wherein the ester comprises ethyl acetate and the aromatic solvent comprises toluene.

* * * * *